United States Patent
Emami et al.

(10) Patent No.: US 11,638,424 B2
(45) Date of Patent: May 2, 2023

(54) MOSQUITO ATTRACTANT FORMULATIONS AND USES THEREOF

(71) Applicant: Seyedeh Noushin Emami, Stockholm (SE)

(72) Inventors: Seyedeh Noushin Emami, Stockholm (SE); Ingrid Faye, Ingarö (SE)

(73) Assignee: Seyedeh Noushin Emami, Stockholm (SE)

( * ) Notice: Subject to any disclaimer, the term of this patent is extended or adjusted under 35 U.S.C. 154(b) by 244 days.

(21) Appl. No.: 16/853,905

(22) Filed: Apr. 21, 2020

(65) Prior Publication Data

US 2020/0253204 A1 Aug. 13, 2020

Related U.S. Application Data

(63) Continuation of application No. 16/483,060, filed as application No. PCT/GB2018/050317 on Feb. 2, 2018, now abandoned.

(30) Foreign Application Priority Data

Feb. 2, 2017 (GB) ...................... 1701743

(51) Int. Cl.
| | | |
|---|---|---|
| *A01N 27/00* | (2006.01) | |
| *A01N 35/02* | (2006.01) | |
| *A01N 25/02* | (2006.01) | |
| *A01N 25/08* | (2006.01) | |
| *A01N 57/12* | (2006.01) | |

(52) U.S. Cl.
CPC ............. *A01N 35/02* (2013.01); *A01N 25/02* (2013.01); *A01N 25/08* (2013.01); *A01N 27/00* (2013.01); *A01N 57/12* (2013.01)

(58) Field of Classification Search
None
See application file for complete search history.

(56) References Cited

U.S. PATENT DOCUMENTS

| | | | |
|---|---|---|---|
| 6,051,612 A | 4/2000 | Borden et al. | |
| 6,217,891 B1 | 4/2001 | Borden et al. | |
| 8,691,256 B2 | 4/2014 | Enan | |
| 8,734,869 B2 | 5/2014 | Enan | |
| 9,593,339 B1 * | 3/2017 | Bermudes | ........ A61K 39/39558 |
| 2005/0244394 A1 * | 11/2005 | DeChant | ................ A01N 63/50 424/93.461 |
| 2014/0377385 A1 | 12/2014 | Enan | |
| 2020/0008424 A1 | 1/2020 | Emami et al. | |

FOREIGN PATENT DOCUMENTS

| | | |
|---|---|---|
| CN | 102125037 A | 7/2011 |
| WO | 2004/034783 A2 | 4/2004 |
| WO | 2010/143752 A2 | 12/2010 |

OTHER PUBLICATIONS

Lewis, webpage from merckmanuals.com, obtained on Jul. 16, 2022, URL: https://www.merckmanuals.com/home/hormonal-and-metabolic-disorders/electrolyte-balance/overview-of-electrolytes, last modified Oct. 2021 (Year: 2021).*

U.S. Appl. No. 16/483,060, filed Aug. 2, 2019, 2020-0008424, published.

Dormont et al., New methods for field collection of human skin volatiles and perspectives for their application in the chemical ecology of human-pathogen-vector interactions. J Exp Biol. 2013;216(Pt 15):2783-2788.

Emami et al., A key malaria metabolite modulates vector blood seeking, feeding, and susceptibility to infection. Science. 2017;355(6329): 1076-1080.

Ghaninia et al., Natural odor ligands for olfactory receptor neurons of the female mosquito Aedes aegypti: use of gas chromatography-linked single sensillum recordings. J Exp Biol. 2008;211(Pt 18):3020-3027.

Owino et al., An improved odor bait for monitoring populations of Aedes aegypti-vectors of dengue and chikungunya viruses in Kenya. Parasit Vectors. 2015;8:253, 12 pages.

Tchouassi et al., Common host-derived chemicals increase catches of disease-transmitting mosquitoes and can improve early warning systems for Rift Valley fever virus. PLoS Negl Trop Dis. 2013;7(1):e2007, 25 pages.

Yu et al., Behavioural response of female Culex pipiens pallens to common host plant volatiles and synthetic blends. Parasit Vectors. 2015;8:598, 8 pages.

Tapia et al., Identification of volatiles from differently aged red clover (Trifolium pratense) root extracts and behavioural responses of clover root borer (Hylastinus obscurus) (Marsham) (Coleoptera: Scolytidae) to them. Biochemical Systematics and Ecology. Feb. 2007; 35(2):61-7.

International Search Report for Application No. PCT/GB2018/050317, dated Jun. 19, 2018, 5 pages.

Batista et al., Anopheles darlingi (Diptera: Culicidae) displays increased attractiveness to infected individuals with Plasmodium vivax gametocytes. Parasit Vectors. May 29, 2014;7:251.

Berna et al., Analysis of Breath Specimens for Biomarkers of Plasmodium falciparum Infection. J Infect Dis. Oct. 1, 2015;212(7):1120-8.

Borg-Karlson et al., Solid Phase Micro Extraction Technique Used for Collecting Semiochemicals. Identification of Volatiles Released by Individual Signalling Phyllonorycter sylvella Moths. Zeitschrift für Naturforschung C. 1996;51 (7-8): 599-602.

(Continued)

*Primary Examiner* — Robert T. Crow
*Assistant Examiner* — John P Nguyen
(74) *Attorney, Agent, or Firm* — McCarter & English, LLP; Steven G. Davis; Michael J. DeGrazia

(57) ABSTRACT

There is herein provided a mosquito attractant formulation comprising: (a) an aldehyde component; (b) a first monoterpene component; and (c) a second monoterpene component, wherein components (a) to (c) are defined in the description provided herein, 5 and products, uses and methods relating to the same. There is also herein provided the use of the compound HMBPP as a phagostimulant, and products and methods relating to the same.

30 Claims, 3 Drawing Sheets

(56) References Cited

OTHER PUBLICATIONS

Carter et al., The culture and preparation of gametocytes of Plasmodium falciparum for immunochemical, molecular, and mosquito infectivity studies. Methods Mol Biol. 1993;21:67-88.

Chadee et al., Blood-digestion kinetics of four *Anopheles* species from Trinidad, West Indies. Ann Trop Med Parasitol. Oct. 1995,89(5):531-40.

Cornet et al., Malaria infection increases bird attractiveness to uninfected mosquitoes. Ecol Lett. Mar. 2013;16 (3):323-9.

Crawley. The R Book. John Wiley & Sons, Ltd. 2007.

De Moraes et al., Malaria-induced changes in host odors enhance mosquito attraction. Proc Natl Acad Sci U S A. Jul. 29, 2014;111(30):11079-84.

Dekker et al., Carbon dioxide instantly sensitizes female yellow fever mosquitoes to human skin odours. J Exp Biol. Aug. 2005;208(Pt 15):2963-72.

Frame et al., Carbon dioxide emission of the human arm and hand. J Invest Dermatol. Aug. 1972;59(2):155-9.

Galun. Regulation of Blood Gorging. Insect Sci. Applic. May 13, 1987;8(4-6):623-5.

Hughes et al., Wolbachia can enhance Plasmodium infection in mosquitoes: implications for malaria control? PLoS Pathog. Sep. 4, 2014;10(9):e1004182.

Hurd et al., Evaluating the costs of mosquito resistance to malaria parasites. Evolution. Dec. 2005;59(12):2560-72.

Hurd. Manipulation of medically important insect vectors by their parasites. Annu Rev Entomol. 2003;48:141-61.

Kamareddine. The biological control of the malaria vector. Toxins (Basel). Sep. 2012;4(9):748-67.

Kelly et al., Malaria parasites produce volatile mosquito attractants. mBio. Mar. 24, 2015;6(2):e00235-15.

Koella et al., The malaria parasite, *Plasmodium falciparum*, increases the frequency of multiple feeding of its mosquito vector, *Anopheles gambiae* Proc Biol Sci. May 7, 1998;265(1398):763-8.

Kumar et al., Control of Anopheles stephensi breeding in construction sites and abandoned overhead tanks with *Bacillus thuringiensis* var. *israelensis*. J Am Mosq Control Assoc. Mar. 1995;11(1):86-9.

Lacroix et al., Malaria infection increases attractiveness of humans to mosquitoes. PLoS Biol. Sep. 2005;3(9):e298.

Lindberg et al., Immunogenic and antioxidant effects of a pathogen-associated prenyl pyrophosphate in Anopheles gambiae. PLoS One. Aug. 13, 2013;8(8):e73868.

Lyimo et al., Effects of adult body size on fecundity and the pre-gravid rate of Anopheles gambiae females in Tanzania. Med Vet Entomol. Oct. 1993;7(4):328-32.

Moreira et al., A Wolbachia symbiont in Aedes aegypti limits infection with dengue, Chikungunya, and Plasmodium. Cell. Dec. 24, 2009;139(7):1268-78.

Morita et al., Nonpeptide antigens, presentation mechanisms, and immunological memory of human Vgamma2Vdelta2 T cells: discriminating friend from foe through the recognition of prenyl pyrophosphate antigens. Immunol Rev. Feb. 2007;215:59-76.

Omondi et al., Functional development of carbon dioxide detection in the maxillary palp of Anopheles gambiae. J Exp Biol. Aug. 2015;218(Pt 15):2482-8.

Ouédraogo et al., Seasonal patterns of Plasmodium falciparum gametocyte prevalence and density in a rural population of Burkina Faso. Acta Trap. Jan. 2008;105(1):28-34.

Smalley et al., The rate of production of Plasmodium falciparum gametocytes during natural infections. Trans R Soc Trap Med Hyg. 1981;75(2):318-9.

Trager et al., Human malaria parasites in continuous culture. Science. Aug. 20, 1976;193(4254):673-5.

Turner et al., Ultra-prolonged activation of CO2-sensing neurons disorients mosquitoes. Nature. Jun. 2, 2011;474 (7349):87-91.

Werner-Reiss et al., Sensitivity of the mosquito *Aedes aegypti* (*Culicidae*) labral apical chemoreceptors to phagostimulants. J Insect Physiol. Jul. 1999;45(7):629-636.

Wilke et al., Paratransgenesis: a promising new strategy for mosquito vector control. Parasit Vectors. Jun. 24, 2015;8:342.

Yeh et al., Chemical rescue of malaria parasites lacking an apicoplast defines organelle function in blood-stage Plasmodium falciparum. PLoS Biol. Aug. 2011;9(8):e1001138.

\* cited by examiner

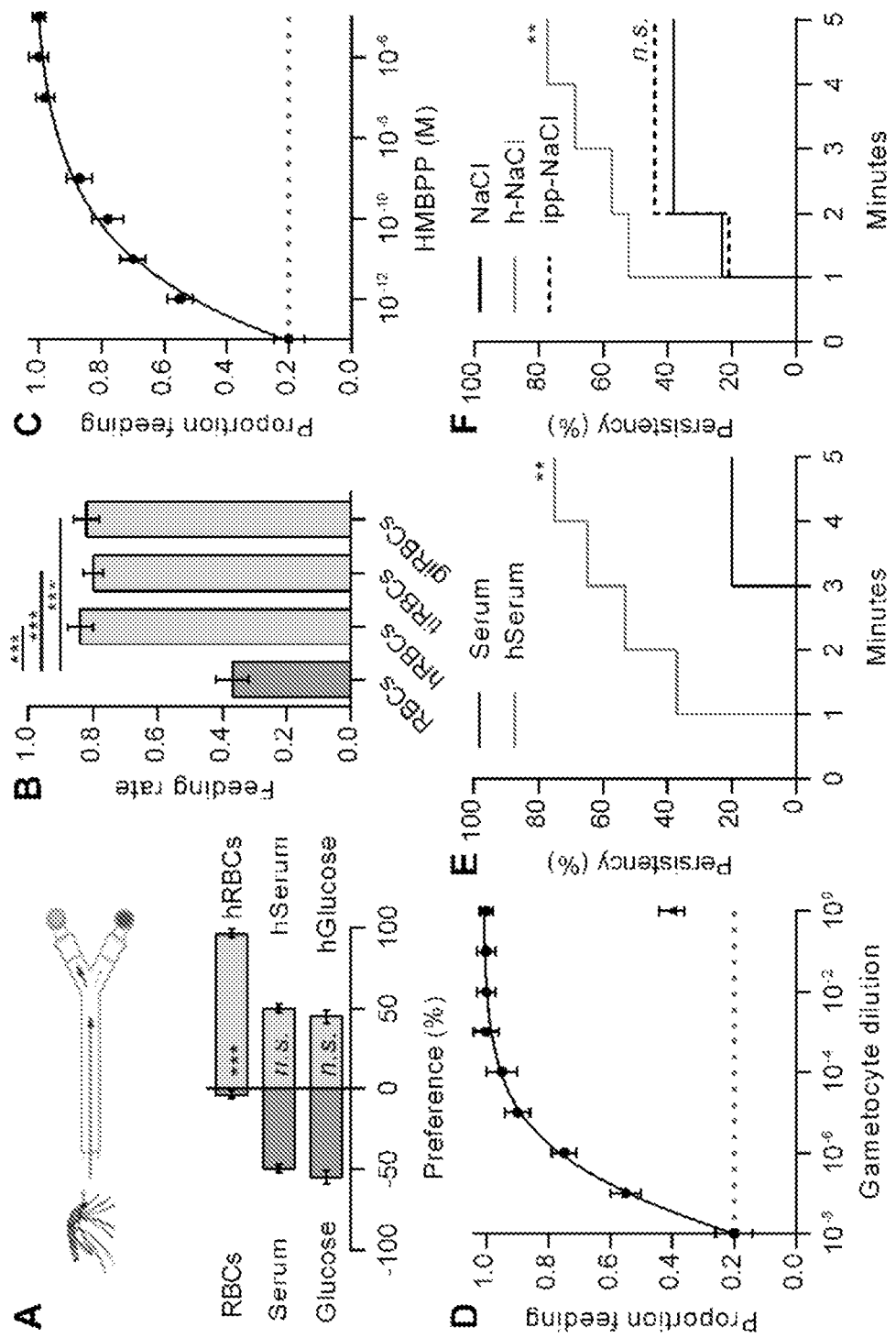
Figures 1A-F

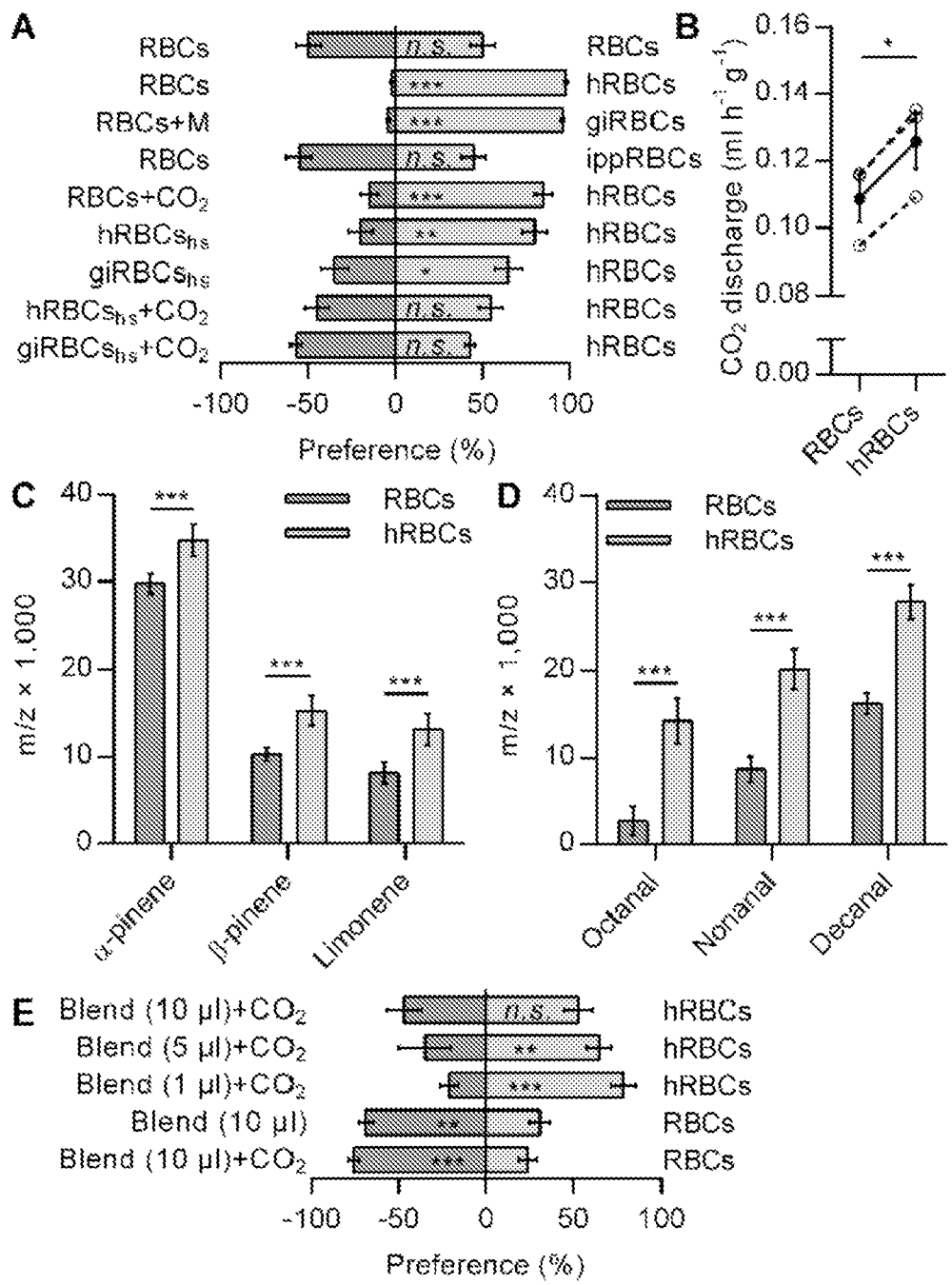
Figures 2A-E

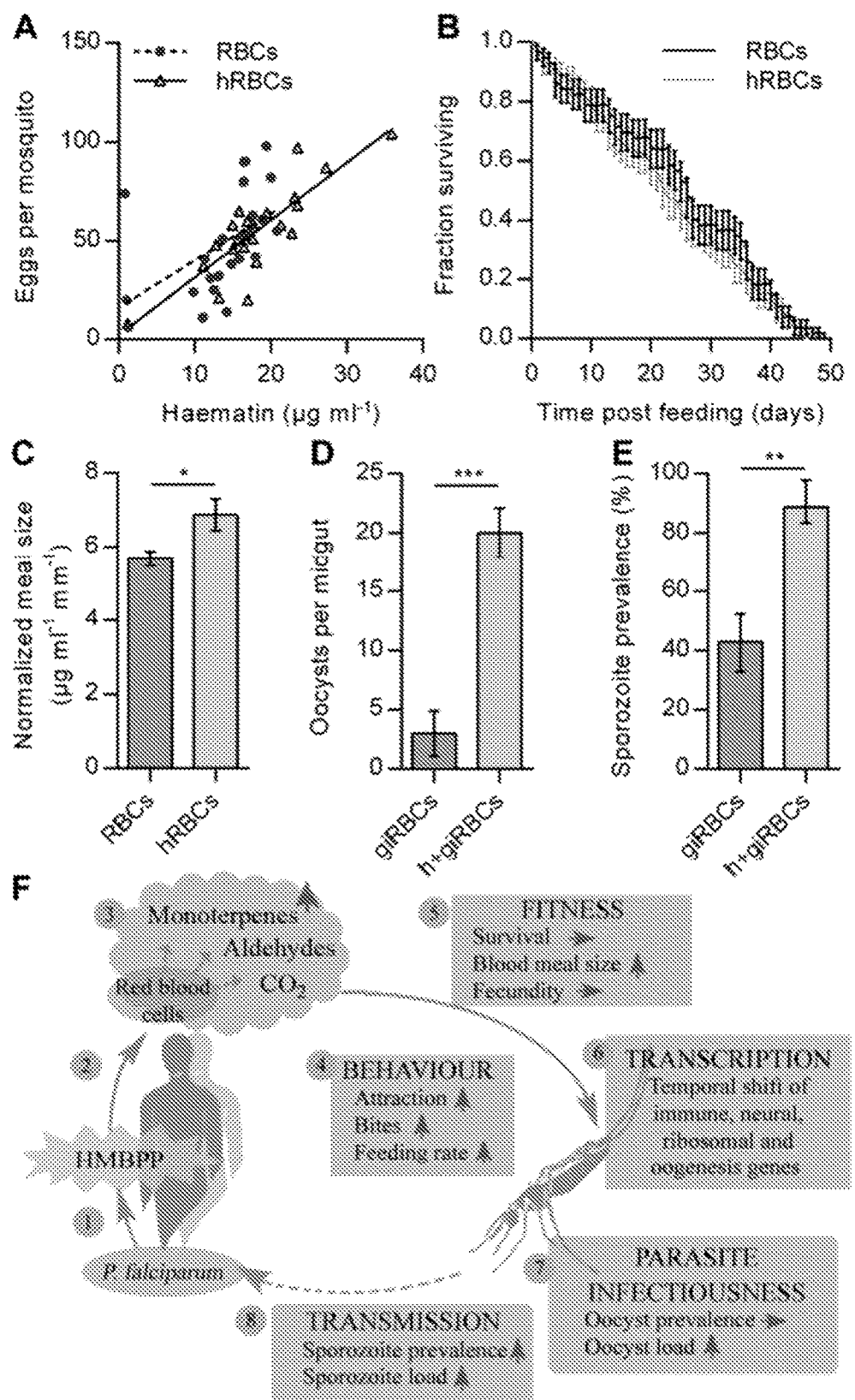
Figures 3A-F

MOSQUITO ATTRACTANT FORMULATIONS AND USES THEREOF

CROSS-REFERENCE TO RELATED APPLICATIONS

This application is a continuation application of Ser. No. 16/483,060, filed on Aug. 2, 2019, which is a U.S. national stage filing, under 35 U.S.C. § 371(c), of International Application No. PCT/GB2018/050317, filed on Feb. 2, 2018, which claims priority to United Kingdom Patent Application No. 1701743.5, filed on Feb. 2, 2017. The entire contents of each of the aforementioned applications are incorporated herein by reference.

FIELD OF THE INVENTION

The present invention relates to new formulations and methods for the control of mosquito populations. Specifically, it relates to formulations useful as mosquito attractants and the use of compounds as phagostimulants in mosquitoes, both of which are useful in the trapping and/or killing of mosquitoes.

BACKGROUND OF THE INVENTION

The listing or discussion of an apparently prior-published document in this specification should not necessarily be taken as an acknowledgement that the document is part of the state of the art or is common general knowledge.

Mosquitoes are small insects that constitute the family Culicidae. Females of most species are ectoparasites, whose tube-like mouthparts (called a proboscis) pierce the hosts' skin to consume blood. Thousands of species of mosquito are known to feed on the blood of various kinds of hosts, mainly vertebrates, including mammals, birds, reptiles, amphibians, and even some kinds of fish. Although the loss of blood is seldom of any importance to the victim, the saliva of the mosquito often causes an irritating rash that is a serious nuisance.

Much more serious though are the roles of many species of mosquitoes as vectors of infectious diseases. In passing from host to host, some transmit infections that are extremely harmful in humans, such as malaria, yellow fever, Chikungunya, West Nile virus, dengue fever, filariasis, Zika virus and other arboviruses. For this reason, the various species of mosquitoes are commonly regarded as being amongst the deadliest animals.

Vector-borne diseases like malaria present compelling challenges for global public health. 50% of the world's population live under the threat of malaria. Newly emerging resistance to the main drug used, artemisinin, has highlighted the necessity to find new strategies to control malaria, such as blocking transmission of the parasite through the mosquito vector. Malaria transmission is driven by the need of female mosquitoes to take a blood meal on a vertebrate host, to allow her to develop a batch of eggs. During blood feeding, she can pick up the transmission stage of the parasite in the blood, and also transmit infection acquired during a previous blood meal. Female mosquitoes seek a vertebrate host from which to take blood every 2-3 days under natural conditions. In mosquitoes, olfaction and gustation as a sensory mode predominates the host attraction and feeding stimulation behaviour. Once mosquitoes have located a suitable host through olfaction, the aggressiveness with which the vector takes a blood meal is measured as in persistence (time spent feeding) and number of probes. The amount of blood taken, and the speed of feeding, also vary between mosquitoes, and are known as feeding stimulation.

Mosquito vector control strategies seek to manage the population of mosquitoes to reduce their damage to human health, economies and enjoyment, and to halt the transmission cycle of mosquito-borne diseases. Mosquito control is a vital public-health practice throughout the world and particularly in the tropics where the spread of diseases, such as malaria, by mosquitoes is especially prevalent.

Many measures have been tried for mosquito control, including the elimination of breeding places, exclusion via window screens and mosquito nets, biological control with parasites such as fungi and nematodes, chemical control with mosquito killing agents, such as pesticides, or control through the action of predators, such as fish, copepods, dragonfly nymphs and adults, and some species of lizards.

In order to allow for the successful control of mosquitoes, for example, when using methods having a direct effect, such as when using chemical or biological agents, it is first necessary to attract mosquitoes so that they are brought into proximity or contact with the relevant agent and, in some cases, to induce the mosquitoes to consume a sufficient amount of that agent in order for it to take effect. To this end, various chemical compounds and formulations have been developed which have a mosquito attractant effect. These compounds and formulations are often combined with mosquito trapping devices, which are designed to lure and retain (e.g. by killing) the mosquito.

Nevertheless, the mosquito attractant formulations known in the art have several limitations. In particular, compounds and formulations known in the art are found to have only a limited attractant effect, which may diminish rapidly over time. Moreover, known mosquito control agents, such as chemical and biological control agents, often suffer from poor efficacy due to difficulties in ensuring an adequate level of consumption of such agents by the target organism. Thus, there exists a significant need for improved methods for attracting mosquitoes and for stimulating mosquitoes to consume control agents.

Malaria is a mosquito-borne infectious disease affecting humans and other animals caused by parasitic protozoans (a group of single-celled microorganisms) belonging to the *Plasmodium* type. Malaria causes symptoms that typically include fever, fatigue, vomiting, and headaches. In severe cases, it can cause seizures, coma, or death.

Previous studies have shown that mosquitoes are generally more attracted to hosts infected with malaria than to healthy hosts, including humans, mice and birds (see J. C. Koella, et al., Proc. Biol. Sci., 265, 763-768 (1998), R. Lacroix, et al., PLoS Biol, 3, e298 (2005), E. P. Batista, E. F. Costa, et al., Parasit Vectors, 7, 251 (2014), and S. Cornet, et al., Ecol Lett, 16, 323-329 (2013))

The malaria parasite is host specific and the vector species attracted and transmitting the disease are found amongst *Anopheles* and *Culex* mosquitoes. Increased attraction of the vector to the infected vertebrate host confers an evolutionary advantage to the parasite as it increases host-vector contact, thus enhancing chances of parasite transmission. Moroever, the increase in attraction coincides, at least in part, with changes in odor profiles of the respective hosts carrying malaria (see C. M. De Moraes et al., Proc Natl Acad Sci USA, 111, 11079-11084 (2014), M. Kelly et al., MBio, 6, (2015), and A. Z. Berna et al., J Infect Dis., 212, 1120-1128 (2015)).

Further, previous studies have identified certain compounds as acting as phagostimulants in mosquitoes, i.e. agents that promote increased feeding (so-called "blood engorging"), such as sugars and adenine nucleotides (see U. Werner-Reiss, et al., Journal of Insect Physiology, 45, 629-636 (1999) and R. Galen, Insect Sci Applic, 8, 623-625 (1987)).

The non-peptidic malaria antigen (E)-4-hydroxy-3-methyl-but-2-enyl pyrophosphate (HMBPP) is a precursor in the 2-C-methyl-D-erythritol 4-phosphate (MEP) pathway for the synthesis of isopentenyl pyrophosphate (IPP) and its isoform dimethylallyl pyrophosphate (DMAPP), the universal building blocks for isoprenoids. Unlike all higher eukaryotes, including humans and mosquitoes that use the mevalonate pathway for IPP and DMAPP synthesis, most eubacteria and apicomplexan parasites like *P. falciparum* use the alternative MEP pathway (see C. T. Morita, et al., Immunol Rev, 215, 59-76 (2007)).

HMBPP is known to be a highly potent activator of human Vγ9Vδ2 T-cells and is also known to trigger innate immune responses in *A. gambiae* s.l. (see ibid. and B. G. Lindberg et al., PLoS One 8, e73868 (2013)). However, further effects of HMBPP in humans and mosquitoes have not been previously described.

DETAILED DESCRIPTION OF THE INVENTION

It has now been found that (E)-4-hydroxy-3-methyl-but-2-enyl pyrophosphate (HMBPP) has potent effects on human metabolism, both directly and indirectly, on mosquito behavior, which effects are of potential use in mosquito control.

Firstly, it has been unexpectedly found that HMBPP, when released by the malaria parasite in an infected human host, interacts with human red blood cells (hRBCs) to stimulate the increased release of carbon dioxide and a mixture of a certain aldehyde and monoterpene compounds, which when presented in a proper blend has a potent mosquito attractant effect.

Thus, in the first aspect of the invention, a mosquito attractant formulation, is provided, comprising the following components:

(a) an aldehyde component comprising at least one compound selected from the group consisting of
  (i) octanal,
  (ii) nonanal, and
  (iii) decanal;
(b) a first monoterpene component comprising at least one compound selected from the group consisting of
  (I) α-pinene, and
  (II) β-pinene; and
(c) a second monoterpene component comprising the compound limonene, which may be referred to herein as the formulation of the first aspect of the invention.

The skilled person will understand that references herein to particular aspects of the invention (e.g. references to formulations of the first aspect of the invention) will include references to all embodiments and particular features thereof.

Unless indicated otherwise, all technical and scientific terms used herein have the same meaning as commonly understood by one of ordinary skill in the art to which this invention pertains.

All embodiments of the invention and particular features mentioned herein may be taken in isolation or in combination with any other embodiments and/or particular features mentioned herein (hence describing more particular embodiments and particular features as disclosed herein) without departing from the disclosure of the invention.

As described herein, formulations of the first aspect of the invention are found to have a potent mosquito attractant effect, hence such formulations may be referred to herein as mosquito attractant formulations. Alternatively, such formulations may be referred to simply as a formulation, composition, mixture, or the like (i.e. with no reference to the mosquito attractant effect).

The skilled person will understand that references herein to a mosquito attractant effect (or to formulations capable of mosquito attraction, mosquito lures or bait, and the like) will refer to an ability to alter the behaviour of one or more mosquitoes such that their direction of travel is altered by movement thereto.

For example, such a mosquito attractant effect may be characterised by an increase in the propensity of a sample of mosquitoes to travel in a direction as affected by the presence of the substance(s) (e.g. the formulation, such as the formulation of the first aspect of the invention) having that effect.

Such an increase may be qualitative (e.g. an observation of a general change in mosquito behaviour) or, in particular, may be quantitative (i.e. measurable). In such circumstances, such an effect may be characterised by at least a 10% (e.g. at least a 20%, such as at least a 30% or, particularly at least a 50% or, more particularly, at least a 100%) increase in the propensity of a sample of mosquitoes to adjust the direction of travel thereto.

Alternatively, the skilled person will be aware of various means by which such effects may be assessed (e.g. measured) by experiments performed in a controlled setting, such as may be described in more detail herein. For example, such experiments may assess the increased bias of mosquitoes to travel towards (e.g. along a predefined pathway towards) and/or land upon the substance the substance having the mosquito attractant effect. In such circumstances, such an effect may be characterised by at least a 10% (e.g. at least a 20%, such as at least a 30% or, particularly at least a 50%) increase in said bias.

Without wishing to be bound by theory, it is believed that formulations of the first aspect of the invention may deliver the desired mosquito attractant effect when they comprise at least one of the compounds referred to as being comprised in the aldehyde component. Of these compounds, the compound octanal has been found to be particularly potent in delivering the desired effect.

Thus, in a particular embodiment (i.e. a particular embodiment of the formulation of the first aspect of the invention) the aldehyde component comprises at least octanal.

In more particular embodiments, the aldehyde component comprises at least octanal and at least one (e.g. one) compound selected from nonanal and decanal.

Further, it has been found that the first monoterpene component may in particular comprise the compound α-pinene.

Alternatively, the first monoterpene component may comprise the compound β-pinene.

In a particular embodiment that may be mentioned, the first monoterpene component optionally further comprises both the compounds α-pinene and β-pinene.

In particular embodiments that may be mentioned, there are provided formulations of the first aspect of the invention wherein:

(a) the aldehyde component comprises each of the compounds
   (i) octanal,
   (ii) nonanal, and
   (iii) decanal; and/or (e.g. and)
(b) the first monoterpene component comprises each of the compounds
   (I) α-pinene, and
   (II) β-pinene.

For the avoidance of doubt, the skilled person will understand that references herein to compositions (e.g. formulations) comprising certain compounds will refer to those compositions containing a detectable (i.e. measurable) amount of that compound (e.g. measurable using analytical techniques known to those skilled in the art, such as various chromatographic techniques). In particular, they may refer to such compositions containing a significant amount of that compound, which may be understood to refer to an amount sufficient for the presence of the compound to have a detectable effect on a relevant function of the composition (e.g. as a mosquito attractant).

In particular embodiments that may be mentioned, the formulation comprises:
   from about 50% to about 80% by weight of the compounds forming the aldehyde component (i.e. component (a) as defined in the first aspect of the invention);
   from about 5% to about 20% by weight of the compounds forming the first monoterpene component (i.e. component (b) as defined in the first aspect of the invention); and/or (e.g. and)
   from about 10% to about 30% by weight of the compounds forming the second monoterpene component (i.e. component (c) as defined in the first aspect of the invention),
wherein the percentage by weight refers to the total combined weight of each of those three components as comprised in the formulation.

For the avoidance of doubt, the skilled person will understand that references to the total combined weight of components as comprised in the formulation will refer to the weight as a percentage of the weight of those components within the formulation (and not any other components that may be comprised in the formulation) taken together. As such, the skilled person will understand that, when selecting within the ranges of such components specified, the combined total of the percentage weight of each component must equate to 100%.

As used herein, the term "about" may be understood to refer to a value that is within 10% (e.g. within 5%, such as within 1%, 0.5% or, particularly, 0.2% or, more particularly, 0.1%) of the value (e.g. the amount, i.e. as a proportion thereof) specified. Alternatively, the term "about" as used herein may be removed throughout.

In particular embodiments that may be mentioned, the formulation comprises:
   from about 60% to about 80% (e.g. about 65% to about 75%) by weight of the compounds forming the aldehyde component (i.e. component (a) as defined in the first aspect of the invention);
   from about 8% to about 18% (e.g. about 10% to about 14%) by weight of the compounds forming the first monoterpene component (i.e. component (b) as defined in the first aspect of the invention); and/or (e.g. and)
   from about 15% to about 25% (e.g. about 16% to about 22%, such as about 16% to about 20%) by weight of the compounds forming the second monoterpene component (i.e. component (c) as defined in the first aspect of the invention),
wherein the percentage by weight refers to the total combined weight of each of those three components as comprised in the formulation.

In more particular embodiments that may be mentioned, the formulation comprises:
   from about 70% by weight of the compounds forming the aldehyde component (i.e. component (a) as defined in the first aspect of the invention);
   from about 12% by weight of the compounds forming the first monoterpene component (i.e. component (b) as defined in the first aspect of the invention); and/or (e.g. and)
   from about 18% by weight of the compounds forming the second monoterpene component (i.e. component (c) as defined in the first aspect of the invention),
wherein the percentage by weight refers to the total combined weight of each of those three components as comprised in the formulation.

The skilled person will understand that formulations of the first aspect of the invention may be prepared simply as a mixture of each of the specified components, i.e. without significant amounts of any other component.

Thus, in particular embodiments that may be mentioned, there is provided a formulation of the first aspect of the invention wherein:
(a) the aldehyde component consists essentially of each of the compounds
   (i) octanal,
   (ii) nonanal, and
   (iii) decanal;
(b) the first monoterpene component consists essentially of each of the compounds
   (I) α-pinene, and
   (II) β-pinene; and/or (e.g. and)
(c) the second monoterpene component consists essentially of limonene.

As used herein, the term "consists essentially of" may be understood to mean that the composition (e.g. the formulation) contains no significant amount of any component other than those specified. In particular, the term may indicate that less than 10% (e.g. less than 5%, such as less than 1% or, particularly, less than 0.1%) of the composition (e.g. the formulation) is formed from components other than those specified. Alternatively, the term "consists essentially of" as used herein may be replaced with the term "consists of".

In particular embodiments that may be mentioned, the formulation of the first aspect of the invention comprises or consists essentially of (e.g. comprises) each of the compounds in amounts as indicated in the table below as a percentage of the total combined weight of those compounds as comprised in the formulation:

| Compound | % by weight |
| --- | --- |
| Octanal | from about 0 to about 80 |
| Nonanal | from about 0 to about 80 |
| Decanal | from about 0 to about 80 |
| α-pinene | from about 5 to about 15 |
| β-pinene | from about 0 to about 10 |
| Limonene | from about 10 to about 30 |

In more particular embodiments that may be mentioned, the formulation of the first aspect of the invention comprises or consists essentially of (e.g. comprises) each of the compounds in amounts as indicated in the table below as a percentage of the total combined weight of those compounds as comprised in the formulation:

| Compound | % by weight |
| --- | --- |
| Octanal | from about 10 to about 80 (e.g. from about 20 to about 80) |
| Nonanal | from about 0 to about 70 (e.g. from about 0 to about 60) |
| Decanal | from about 0 to about 70 (e.g. from about 0 to about 60) |
| α-pinene | from about 5 to about 15 |
| β-pinene | from about 0 to about 10 |
| Limonene | from about 10 to about 30 |

In yet more particular embodiments that may be mentioned, the formulation of the first aspect of the invention comprises or consists essentially of (e.g. comprises) each of the compounds in amounts as indicated in the table below as a percentage of the total combined weight of those compounds as comprised in the formulation:

| Compound | % by weight |
| --- | --- |
| Octanal | from about 20 to about 26 |
| Nonanal | from about 31 to about 39 |
| Decanal | from about 10 to about 14 |
| α-pinene | from about 5 to about 9 |
| β-pinene | from about 3 to about 7 |
| Limonene | from about 15 to about 21 |

In further embodiments that may be mentioned, the formulation of the first aspect of the invention comprises or consists essentially of (e.g. comprises) each of the compounds in amounts as indicated in the table below as a percentage of the total combined weight of those compounds as comprised in the formulation:

| Compound | % by weight |
| --- | --- |
| Octanal | from about 21 to about 25 |
| Nonanal | from about 33 to about 37 |
| Decanal | from about 11 to about 13 |
| α-pinene | from about 6 to about 8 |
| β-pinene | from about 4 to about 6 |
| Limonene | from about 16 to about 20 |

For example, in embodiments that may be mentioned, the formulation of the first aspect of the invention comprises or consists essentially of (e.g. comprises) each of the compounds in amounts as indicated in the table below as a percentage of the total combined weight of those compounds as comprised in the formulation:

| Compound | % by weight |
| --- | --- |
| Octanal | about 23 (e.g. 23 ± 0.19) |
| Nonanal | about 35 (e.g. 35 ± 0.21) |
| Decanal | about 12 (e.g. 12 ± 0.11) |
| α-pinene | about 7 (e.g. (e.g. 7 ± 0.06) |
| β-pinene | about 5 (e.g. 5 ± 0.04) |
| Limonene | about 18 (e.g. 18 ± 0.17) |

The skilled person will also understand that formulations of the first aspect of the invention may be defined based on the relative amount of each component present in the formulation (i.e. by the ratio of those components).

Thus, in particular embodiments of the first aspect of the invention the ratio of each of components is as indicated in the table below:

| Component | ratio (by weight) |
| --- | --- |
| Aldehyde (component (a)) | about 2.5 to about 7.5 |
| First monoterpene (component (b)) | about 0.5 to about 1.5 |
| Second monoterpene (component (c)) | about 1.5 to about 2.5 |

In more particular embodiments of the first aspect of the invention the ratio of each of components is as indicated in the table below:

| Component | ratio (by weight) |
| --- | --- |
| Aldehyde (component (a)) | about 3 to about 7 |
| First monoterpene (component (b)) | about 1 |
| Second monoterpene (component (c)) | about 2 |

For example, in embodiments of the first aspect of the invention that may be mentioned, the ratio of each of components is as indicated in the table below:

| Component | ratio (by weight) |
| --- | --- |
| Aldehyde (component (a)) | about 7 |
| First monoterpene (component (b)) | about 1 |
| Second monoterpene (component (c)) | about 2 |

Further, particularly in embodiments wherein the aldehyde component comprises (or consists essentially of) octanal (more particularly, wherein the first monoterpene component comprises, or consists essentially of, α-pinene), the ratio of each of components may be as indicated in the table below:

| Component | ratio (by weight) |
| --- | --- |
| Aldehyde (component (a)) | about 3 |
| First monoterpene (component (b)) | about 1 |
| Second monoterpene (component (c)) | about 2.5 |

Alternatively, particularly in embodiments wherein the aldehyde component comprises (or consists essentially of) nonanal (more particularly, wherein the first monoterpene component comprises, or consists essentially of, α-pinene), the ratio of each of components may be as indicated in the table below:

| Component | ratio (by weight) |
| --- | --- |
| Aldehyde (component (a)) | about 5 |
| First monoterpene (component (b)) | about 1 |
| Second monoterpene (component (c)) | about 2.5 |

For the avoidance of doubt, the monoterpene compounds referred to in the first aspect of the invention may be represented structurally and/or alternatively named as follows:

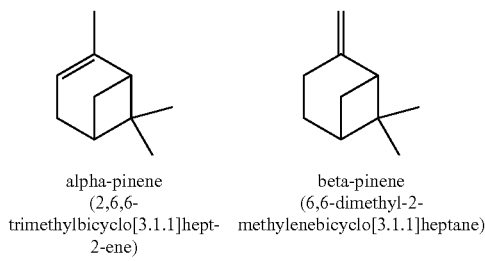

alpha-pinene
(2,6,6-trimethylbicyclo[3.1.1]hept-2-ene)

beta-pinene
(6,6-dimethyl-2-methylenebicyclo[3.1.1]heptane)

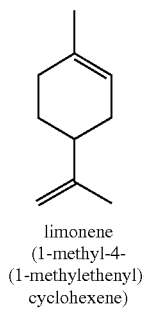

limonene
(1-methyl-4-(1-methylethenyl)-cyclohexene)

For the avoidance of doubt, where the stereochemistry of a compound is not indicated in the name thereof (or where, structurally, the stereochemistry of a bond is either not indicated or, optionally, represented as a wavy line) that compound will be understood to be present as a racemate (i.e. as an equal mixture of enantiomers), as an unequal mixture of enantiomers or as a single enantiomer thereof. For example, the compound limonene may be present as a racemic mixture (i.e. (±)-limonene) or as either enantiomer (i.e. (+)-limonene or (−)-limonene), wherein in the latter case the sample may contain the particular enantiomer specified in an enantiomeric excess (e.e.) of at least 90% (such as at least 95%, e.g. at least 99%, which also may be referred to as being in the substantial absence of the other enantiomer). Similar reasoning will apply to the other monoterpene compounds present. In particular, unless otherwise specified, each compound may be present as a racemic mixture.

For the avoidance of doubt, references to the compounds octanal, nonanal and decanal will be understood to refer to the linear (i.e. non-branched) aldehydes, which may alternatively be referred to as n-octanal, n-nonanal and n-decanal, respectively.

In embodiments wherein the formulation of the first aspect of the invention may comprise further (i.e. additional) components, those components may be selected in order to modify certain properties of the formulation, such as to modify the viscosity, and/or to render the formulation suitable for storage and/or transport.

Thus, in particular embodiments, the formulation further comprises (i.e. in addition to comprising the compounds specified) one or more additional component selected from the list consisting of: preservatives, stabilizing agents, anti-oxidants, colourants, solvents and gelling agents.

For example, in particular embodiments that may be mentioned, the formulation further comprises one or more (e.g. one) component that is an anti-oxidant. Particular anti-oxidant compounds that may be mentioned include butylated hydroxytoluene (BHT), which is also known as dibutylhydroxytoluene. For the avoidance of doubt, the structure of BHT is represented below.

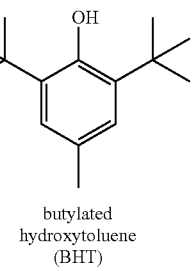

butylated
hydroxytoluene
(BHT)

For example, in particular embodiments, the formulation of the first aspect of the invention may comprise about 5% BHT by weight of the complete formulation.

The skilled person will understand that the components of the formulations as described herein may be mixed together in order to provide a blend (i.e. a uniform mixture) of the components, which may be obtained and characterized using techniques known to those skilled in the art. Thus, the formulation of the first aspect of the invention may be described as being a blend of the components specified (as described herein).

The skilled person will understand that formulations of the first aspect of the invention may be provided in a variety of physical forms, which forms will depend on the nature of the components thereof. For example, formulations may exist in liquid form, which liquid form may derive from the nature of the components of the formulation and/or the nature of any additional components.

In a particular embodiment, the formulation is provided in liquid form (e.g. in the form of a free-flowing liquid).

In a more particular embodiment, the formulation is provided as a solution in a suitable solvent.

As used herein, the term "solution" may take its normal meaning in the art, namely referring to a liquid mixture in which the solute (which, in certain instances, may be the minor component) is uniformly distributed within the solvent (which, in certain instances, may be the major component).

In particular embodiments, there is provided formulations wherein the combined weight of the specified components (i.e. components (a), (b) and (c) as defined herein) is at least 10% (e.g. at least 20%, such as at least 30% or, particularly at least 40%) of the total weight of the formulation.

The skilled person will understand that formulations as described herein (such as the formulation of the first aspect of the invention, including all embodiments and features thereof) may be provided in conjunction with a solid or semi-solid carrier, wherein the formulation may be, for example, absorbed in, adsorbed on, or suspended and/or encapsulated (e.g. where evenly distributed) within said solid or semi-solid carrier.

Thus, in particular embodiments, the formulation is provided in conjunction with a suitable solid or semi-solid carrier.

In more particular embodiments, the suitable solid or semi-solid carrier is:
  a wax, wax-like, gel or gel like material;
  an absorbent solid material or material capable of having the formulation adsorbed thereon; or
  a solid matrix capable of having the formulation contained therein.

For example, in particular embodiments, the formulation is provided in conjunction with a wax or wax-like carrier (e.g. a wax), particularly wherein the formulation is evenly distributed throughout the wax or wax-like carrier. Particular wax-like carriers that may be mentioned include paraffin (which may be referred to as paraffin wax).

Alternatively, the formulation may be provided in conjunction with an absorbent solid material, such as in a form wherein said formulation is absorbed in (i.e. impregnated in) said solid.

For example, the formulation may be absorbed in an absorbent paper or paper-like material, or a fabric material (e.g. a fabric constructed from natural fibres, such as a cotton fabric).

Further, in embodiments wherein the formulation is provided in conjunction with an absorbent solid material, such conjunctions of materials may be prepared by absorbing said formulation into said solid material. Such conjunctions of absorbent solid material and formulations (e.g. formulations of the first aspect of the invention) may be provided by absorbing the formulation into the solid material, particularly where the formulation comprises a suitable (e.g. volatile) solvent and, following absorption, said solvent is allowed to evaporate to result in an absorbed formulation comprising a lower amount of (or essentially none of) that solvent.

Alternatively, the formulation may be adsorbed on a solid material and/or contained within a solid matrix of a solid material.

For example, the formulation may be adsorbed and/or contained within a plurality of solid beads, such as suitable plastic beads. Particular plastic bead-based carrier systems that may be used include that marketed by Biogents® as the BG-Lure™ system/carriage.

As described herein, formulations of the invention may be suitable for use in attracting mosquitoes, such as those mosquitoes known to act as vectors for the transmission of diseases, such as malaria, in humans.

Particular species of mosquitoes that may be mentioned (in relation to all aspects, embodiments and features of the invention, and combinations thereof, as described herein) include *Anopheles*, such as *Anopheles gambiae*, and *Culex* mosquitoes.

For the avoidance of doubt, in certain embodiments that may be mentioned, the formulation of the first aspect of the invention consists essentially of components (a), (b) and (c) as defined therein.

As described herein, formulations of the first aspect of the invention are useful as mosquito attractants, which may be employed in methods for mosquito control.

In a second aspect of the invention, there is provided the use of a formulation of the first aspect of the invention (including all embodiments and features thereof) as a mosquito attractant.

In a particular embodiment (i.e. a particular embodiment of the second aspect of the invention), the use forms part of a method of trapping and/or killing mosquitoes, such as a method described herein.

In a third aspect of the invention, there is provided a method of attracting and, optionally, trapping and/or killing mosquitoes, wherein the method comprises the step of providing a mosquito attractant formulation of the first aspect of the invention.

In a particular embodiment (i.e. an embodiment of the third aspect of the invention), the method is for attracting and trapping and/or killing mosquitoes.

The skilled person will appreciate that methods comprising trapping and/or killing mosquitoes may comprise the use of a device suitable for such trapping and/or killing, which device may be used in conjunction with the formulation of the first aspect of the invention.

Devices suitable for trapping and/or killing mosquitoes are well-known to those skilled in the art. In particular, devices that may be suitable for use in methods as described herein (e.g. methods of the third aspect of the invention) will include those devices comprising one or more substance or composition for use in (i.e. employed with the purpose of) attracting mosquitoes. In utilising such devices, the skilled person will appreciate that the device may be adjusted and/or modified, as appropriate, using routine skill in the art, e.g. by replacement of some or all of the substance or composition for use in attracting mosquitoes with the formulation of the first aspect of the invention, or by addition of the formulation of the first aspect of the invention to the device (i.e. in combination with the existing substance or composition).

Thus, in particular embodiments, the method is for trapping mosquitoes and the formulation is provided as part of a suitable mosquito-trapping device.

As described herein, it is known that mosquito attraction may be stimulated or enhanced by substances that activate the carbon dioxide receptor in mosquitoes, such as carbon dioxide or compounds which are agonists of the mosquito carbon dioxide receptor. It may therefore be beneficial to combine the mosquito attractant effect of the formulation of the first aspect of the invention with that of carbon dioxide or compounds which are agonists of the mosquito carbon dioxide receptor.

Thus, in particular embodiments, the method comprises the step of providing a source of gaseous carbon dioxide and/or an agonist for the mosquito carbon dioxide receptor.

As used herein, references to "providing a source" may refer to provide said material (e.g. gaseous carbon dioxide and/or an agonist for the mosquito carbon dioxide receptor) in a manner such that it may provide the desired effect (e.g. enhancement of mosquito attraction). For example, where the reference applies to gaseous carbon dioxide and/or an agonist for the mosquito carbon dioxide receptor, it may refer to providing (e.g. emitting) gaseous carbon dioxide and/or a gaseous agonist for the mosquito carbon dioxide receptor, or allowing the agonist for the mosquito carbon dioxide receptor to (partially or fully) evaporate such that it enters the gaseous state.

Further, references to "providing a source" may also require that said source is provided in adequate proximity to the other component(s) provided (e.g. to the formulation of the first aspect of the invention), which may require that said source is provided in sufficient proximity to the other component(s) provided in order for those components to produce a combined effect as required (e.g. a combined effect in attracting mosquitoes). For example, references to providing components in adequate proximity may refer to providing said components (or the source thereof) as part of the same device (e.g. as contained in or attached to the same body of the device, such as within the same housing).

Particular sources of carbon dioxide that may be mentioned (e.g. for use in the method of the third aspect of the invention) include gaseous carbon dioxide (which may be provided in the form of a pressurised canister, which when vented will release carbon dioxide), dry ice (i.e. solid carbon dioxide) and flammable materials, such as hydrocarbons (e.g. propane and/or butane), which may be combusted in order to generate carbon dioxide, and combinations thereof.

As used herein, references to "agonists of the mosquito carbon dioxide receptor" and the like will refer to compounds that produce a detectable biological response when interacting with the mosquito carbon dioxide receptor (which may be referred to as the carbon dioxide-detecting neurons in the mosquito), which response may be quantitative (e.g. measurable as change in biology in the mosquito) or qualitative (e.g. an observed change in the behaviour of the mosquito).

The skilled person will understand that various compounds which are agonists of the mosquito carbon dioxide receptor are known in the art (see, for example, S. L. Turner, et al., Nature, 474, 87 (2011))

Particular agonists of the mosquito carbon dioxide receptor that may be mentioned include 2-butanone (in which case the source of 2-butanone may be said compound in gas or, particularly, liquid form).

Particular mosquito trapping and/or killing devices that may be utilised in the methods described herein (e.g. in the method of the third aspect of the invention) will be well known to those skilled in the art, such as: Mosquito Magnet®; and Biogents® devices BG-Mosquitaire, BG-Mosquitaire CO2 and BG-Mosquitito™, and similar devices.

The skilled person will understand that the components of the formulation of the first aspect of the invention may be provided as one or more separate entities, which may be combined (either through direct mixing or by allowing said components to evaporation in adequate proximity to each other) when in use.

Thus, in a fourth aspect of the invention, there is provided a kit-of-parts comprising each of the compounds required in the components of the first aspect of the invention, e.g. in the form of at least two separate parts (such as wherein one or more, but necessarily not all, of the components may be provided in said kit in admixture, i.e. as a mixture of those components).

Further, the skilled person will understand that the source of carbon dioxide or an agonist of the mosquito carbon dioxide receptor may be provided together with a mosquito attractant formulation or kit-of-parts comprising the components of the mosquito attractant formulation.

Thus, in a fifth aspect of the invention there is provided a combination product or kit-of-parts comprising:

(A) a formulation as defined in the first aspect of the invention or a kit-of-parts as defined in the fourth aspect of the invention; and (B) a source of gaseous carbon dioxide and/or an agonist for the mosquito carbon dioxide receptor.

Secondly, it has been unexpectedly found that the compound (E)-4-hydroxy-3-methyl-but-2-enyl pyrophosphate (HMBPP) induces a potent phagostimulatory effect on mosquitoes, which is of particular use in stimulating the increased consumption of material (such as food sources) containing mosquito and/or parasite control agents.

In a sixth aspect of the invention, there is provided the use of the compound HMBPP as a phagostimulant in mosquitoes, which compound may be referred to as the compound of the sixth aspect of the invention.

For the avoidance of doubt, the compound HMBPP may be represented structurally as follows:

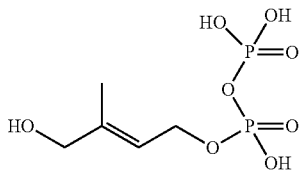

For the avoidance of doubt, the term "phagostimulant" as used herein will take its normal meaning in the art, namely as referring to a compound or substance that induces sustained feeding. Thus, references to a phagostimulant in mosquitoes will be interpreted as indicated that the compound or substance induces sustained feeding in mosquitoes.

The skilled person will be aware of routine methods by which the ability of a compound or substance (e.g. the compound HMBPPP) to induce sustained feeding may be assessed, including both qualitative methods (e.g. by observation of feeding habits) or by quantitative methods (e.g. by measurement of amount of food consumed or time spent feeding), in which case an ability to induce sustained feeding may be indicated by at least a 10% increase (e.g. at least a 20%, such as at least a 30% increase) by either measure (e.g. an increase in time spent feeding) when compared to a suitable control.

In particular embodiments of the sixth aspect of the invention, the compound of the sixth aspect of the invention may be combined with, or form part of a formulation further comprising, a suitable food source, i.e. a source of nourishment (e.g. by way of providing carbohydrates, lipids, proteins, vitamins, minerals, electrolytes and/or hydration, or the like) in mosquitoes. For example, particular food sources that may be mentioned include sugars, such as aqueous sugar solutions.

The skilled person will understand that, where the compound of the sixth aspect of the invention is combined with a suitable food source, the compound and the food source may be provided in admixture (i.e. the compound may be mixed with and distributed throughout the food source).

In particular embodiments of the sixth aspect of the invention, the compound of the sixth aspect of the invention may also be combined with, or as part of formulation further comprising, a mosquito and/or parasite control agent.

As used herein, references to a "a mosquito and/or parasite control agent" may refer to an agent capable of affecting (i.e. controlling) the mosquito population (e.g. by killing mosquitoes, either directly or indirectly, and/or affecting mosquito breeding) or the ability of the mosquito to act as a vector for the parasite (e.g. the malaria parasite; i.e. parasite control), such as by affecting the ability of the mosquito to carry and/or transmit the parasite.

Thus, as used herein, references to mosquito control agents may refer in particular to: a mosquito killing agent, which may generally refer to an agent (e.g. a chemical compound) capable of inducing death in mosquitoes upon consumption of an effective amount thereof, such as those known in the art and/or as described herein; and/or (e.g. and) mosquito pathogens, which may refer to biological agents capable of affecting mosquito populations (e.g. by inducing disease in said mosquito population, which may lead to death, or by affecting breeding in said mosquito population, such as by arresting the growth the mosquito larvae).

Particular mosquito pathogens that may be mentioned include bacterial agents; for example, *Bacillus thuringiensis* sub-species, such as *Bacillus thuringiensis* serotype *israelensis* (Bti; see Kamareddine, L., Toxins (Basel), 4(9), 748-767 (2012) and Kumar, A. et al, J. Am. Mosq. Control Assoc., 11, 86-89 (1994)) and *Wolbachia* (see Hughes, G. L. et al., PLoS Pathog, 10(9): e1004182 (2014) and Moreira, L. L. A. et al., Cell, 139, 1268-1278 (2009), the contents of both of which are incorporated herein by reference).

Thus, as used herein, references to parasite (e.g. malaria parasite) control agents may refer in particular to agents capable of affecting the ability of the mosquito (i.e. the vector) to take on, carry and/or transmit the parasite, such as agents capable of killing the parasite within the mosquito (i.e. following infection of the mosquito), such that transmission by the mosquito does not occur.

Particular parasite (e.g. malaria parasite) control agents that may be mentioned include commensal bacteria that have been genetically modified (i.e. paratransgenic bacteria) to kill the transmissible parasite (see A. B. B. Wilke and M. T. Marrelli, Parasites and Vectors, 8, 342(2015), the contents of which are incorporated herein by reference, in particular the bacterial species mentioned therein), thus allowing for effective methods for mosquito and parasite control.

In a seventh aspect of the invention, there is provided a combination product or kit-of parts comprising:

(A) (E)-4-hydroxy-3-methyl-but-2-enyl pyrophosphate (HMBPP); and (B) an effective amount of a mosquito and/or parasite control agent, as defined in the sixth aspect of the invention.

In a particular embodiment of the seventh aspect of the invention, the product or kit further comprises a mosquito attractant, such as a formulation as defined in the first aspect of the invention (including all embodiments and features thereof) or, when in the form of a kit-of parts, a kit-of parts as defined in the fourth aspect of the invention (including all embodiments and features thereof).

In a particular embodiment (i.e. a particular embodiment of the seventh aspect of the invention), the combination product comprises at least 0.1% (e.g. at least 0.25%, such as at least 0.5% or at least 1%) of HMBPP by weight of the product.

In an eighth aspect of the invention, there is provided a method of killing mosquitoes wherein the method comprises the step of providing a combination product as defined in the seventh aspect of the invention (including all embodiments and features thereof).

In a particular embodiment (i.e. a particular embodiment of the eighth aspect of the invention), the combination product is provided as part of a suitable mosquito trapping and/or killing device, such as those described herein.

In a more particular embodiment, the method comprises providing a combination product as described in the seventh aspect of the invention (including all features and embodiments thereof) together with a mosquito attractant formulation as defined in the first aspect of the invention (including all embodiments and features thereof).

In a yet more particular embodiment, the method further comprises providing a source of carbon dioxide and/or an agonist of the mosquito carbon dioxide receptor, as described herein.

In further aspects of the invention as may be mentioned herein, there are provided methods of (or processes for) manufacturing combination products or formulations as described herein, which methods (or processes) may comprise the step of bringing into association (e.g. by mixing) the components of that combination product.

In particular, there may be provided a method of (or process for) manufacturing the formulation of the first aspect of the invention, which method (or process) may comprise the step of bringing into association (e.g. by mixing or causing to be mixed) each of the components thereof (e.g. such as to form a blend, i.e. a uniform mixture, thereof).

Without wishing to be bound by theory, it is thought that the compound HMBPP, as described herein, is released into the blood of an infected subject (e.g. a human) by the malaria parasite and induces effects directed towards increasing parasite sporogonic success in mosquitoes. This effect is mediated both through the induction of human red blood cells (hRBCs) to release a combination of volatile compounds which act as a mosquito attractant, thus promoting the mosquito vector to seek to feed on an infected subject, and by increasing the consumption of mosquitoes during feeding on the subject, thus increasing the amount of parasite ingested by the mosquito.

DESCRIPTION OF THE FIGURES

FIG. 1A: Mosquito preference (lower panel) for red blood cells (RBCs), serum and glucose with PABA in the presence or absence of HMBPP (h) in a dual choice attraction assay (upper panel) [RBCs: $\chi 21=29.11$, $p<0.001$; Serum: $\chi 21=0.26$, $p=0.60$; Glucose with PABA: $\chi 21=0.34$, $p=0.56$].

FIGS. 1B to 1F: Feeding proportions of mosquitoes allowed to feed for 90 s on: (B) RBCs, HMBPP-supplemented RBCs (hRBCs), asexual trophozoite-, or gametocyte-infected RBCs (tiRBCs and giRBCs, respectively) [hRBCs: $z=4.25$, $p<0.001$; tiRBCs: $z=4.59$, $p<0.001$; giRBCs: $z=4.60$, $p<0.001$]; (C) RBCs supplemented with different concentrations of HMBPP; (D) dilutions in RBCs of gametocyte culture supernatants (control RBCs, —) and FR-900098-treated tRBCs supplemented with IPP, ▲; $\chi 21=1.21$, $p=0.42$).

FIGS. 1E and 1F: Percentage of mosquitoes landing, probing and initiating feeding [Persistency (%)] within five minutes on: (E) serum, with and without HMBPP; or (F), physiological salt solution, with or without HMBPP (h-NaCl), as well as IPP-supplemented NaCl (ipp-NaCl) [hSerum: $\chi 21=10.62$, $p=0.001$; hNaCl: $\chi 21=7.93$, $p=0.005$; ipp-Nacl: $\chi 21=1.01$, $p=0.55$]. Error bars, ±SE; asterisks denote significant differences (*$p<0.05$, $p<0.01$, *$p<0.001$; n.s., non-significant, n=180).

FIG. 2A: Attraction of mosquitoes to red blood cells (RBCs), RBCs plus media (M) or HMBPP-supplemented RBCs (hRBCs) was assessed in comparison to RBCs, hRBCs, gametocyte culture supernatant-supplemented RBCs (giRBCs) and isopentenyl pyrophosphate-supplemented RBCs (ippRBCs) and their headspace extracts, with or without $CO_2$ in the wind tunnel assay, as indicated [RBCs/RBCs: $\chi 21=0.25$, $p=0.62$; RBCs/hRBCs: $\chi 21=79.14$, $p<0.001$; RBCs+M/giRBCs: $\chi 21=17.53$, $p<0.001$; RBCs/ippRBCs: $\chi 21=0.49$, $p=0.48$; RBCs+$CO_2$/hRBCs: $\chi 21=41.82$, $p<0.001$; hRBCshs/hRBCs: $\chi 21=6.79$, $p=0.009$; giRBCshs/hRBCs: $\chi 21=14.70$, $p=0.001$; hRBCshs+$CO_2$/hRBCs: $\chi 21=0.39$, $p=0.53$; giRBCshs+CO2/hRBCs: $\chi 21=1.93$, $p=0.16$].

FIG. 2B: $CO_2$ discharge from RBC samples with or without HMBPP [$t=11.28$, $df=1$, $p=0.008$].

FIGS. 2C and 2D: GC-MS analyses of headspace extracts from RBCs and hRBCs [$\chi 21=19.96$, $p<0.001$; $\chi 21=27.12$, $p<0.001$].

FIG. 2E: A synthetic volatile blend (Blend), consisting of the compounds identified as enhanced within the headspace of hRBCs, was tested against both hRBCs and RBCs, with or without $CO_2$. [Blend (10 μl)+$CO_2$/hRBCs: $\chi 21=0.26$, $p=0.28$; Blend (5 μl)+$CO_2$/hRBCs: $\chi 21=7.28$, $p=0.007$; Blend (1 μl)+$CO_2$/hRBCs: $\chi 21=16.56$, $p<0.001$; Blend (10 μl)/RBCs: $\chi 21=9.87$, $p=0.002$; Blend (10 μl)+$CO_2$/RBCs: $\chi 21=17.39$, $p<0.001$]. Error bars, ±SE; asterisks denote significant differences (*$p<0.05$, $p<0.01$, *$p<0.001$; n.s., non-significant, n=90).

FIG. 3A: The relationship between fecundity (number of eggs per mosquito) and blood meal size (haematin) [treatment*hematin: $\chi 21=6.27$, $p=0.01$; treatment: $\chi 21=0.19$, $p=0.66$] of individual mosquitoes (■ hRBCs • RBCs).

FIG. 3B: Survival of mosquitoes monitored daily post-feeding until natural death [Cox hazard proportional model, $\chi 21=0.71$, p=0.39]. This experiment was performed in triplicate (random effect, in each replicate n=210).

FIG. 3C: Average meal size was determined by the amount of haematin excreted and normalised individually to wing length [$\chi 21=5.67$, p=0.02].

FIG. 3D: Average number of oocysts per midgut at 10 dpi [deviance=33.13, df=1, p<0.001].

FIG. 3E: Sporozoite infection (% prevalence in salivary glands of infected mosquitoes) at 14 dpi [$\chi 21=8.84$, p=0.002]. Error bars, ±SE; asterisks denote significant differences (*p<0.05, p<0.01, *p<0.001).

FIG. 3F: Schematic model of proposed HMBPP effects within the malaria parasite transmission cycle: (1) HMBPP produced by $P.\ falciparum$ in an infected human (2) induces an increased release of (3) a volatile blend consisting of $CO_2$, aldehydes and monoterpenes from RBCs. This causes (4) an increased attraction of female mosquitoes. (5) The female blood ingestion size and biting rate increases, while its fecundity and survival does not change. (6) The behavioural and physiological effects are reflected in the mosquito transcriptional profile, in which genes involved in immune responses, oogenesis neuronal synapses as well as translation, are affected. (7) The parasite fitness reward is reflected in an increased infection intensity and prevalence (8) that increases the probability of parasite transmission to another human.

EXAMPLES

The present invention is further illustrated by way of the following examples, which are not intended to be limiting on the overall scope of the invention but which may define certain features and embodiments thereof.

General Experimental Methods

Ethics:

Human blood (type 0) was provided in citrate-phosphate-dextrose-adenine anti-coagulant/preservative, and serum (type AB) was obtained from the Blood Transfusion Service at Karolinska Hospital, Solna, Sweden in accordance with the Declaration of Helsinki and approved by the Ethical Review Board in Stockholm (2011/850-32). The Swedish Work Environment Authority, Stockholm, Sweden (Dnr SU FV-2.10.2-2905-13/31-01-2017) approved the class 3 biological agent laboratory and practices, including insectary design and equipment to work with $P.\ falciparum$ infected mosquitoes. The ordinances are mainly based on the EU directive 2000/54/EC on the protection of workers from risks related to exposure to biological agents at work.

Materials:

(E)-4-hydroxy-3-methyl-but-2-enyl pyrophosphate, HMBPP, and isopentenyl pyrophosphate, IPP, were purchased from Sigma Aldrich (St. Louis, Mo., USA) and Isoprenoids (Tampa, USA, LC), respectively. (2E)-2-methylbut-2-ene-1,4-diol was synthesised and structurally verified by nuclear resonance spectroscopy at Royal Institute of Technology, Stockholm. The anti-coagulant/preservative, citrate-phosphate-dextrose-adenine was from Vacuette (Greiner Bio-One Kremsmünster, Austria). Giemsa stain was purchased from Sigma Aldrich (St. Louis, Mo., USA), and the RPM11640 medium from Gibco (NY, USA). Drierite was from WA Hammond Drierite (Xenia, Ohio, USA) and Ascarite from Thomas Scientific, (Swedesboro, N.J., USA). DNaseI was from Fermentas (Vilnius, Lithuania).

Mosquito Rearing and Blood Feeding:

Mosquitoes used in this study were from the laboratory colony of $A.\ gambiae$ sensu lato (Keele line, University of Glasgow), which was produced by balanced interbreeding of four $A.\ gambiae$ s.s. strains (H. Hurd, et al. Evolution, 59, 2560-2572 (2005)). Larvae were reared under standard insectary conditions (27±1° C., 70% humidity, 12 h light: 12 h dark cycle) and fed on TetraMin fish flakes (Tetra ltd., Germany). Pupae were transferred into holding cages for emergence. Emerged adults were fed ad libitum on 5% glucose solution, supplemented with 0.05% (w/v) 4-aminobenzoic acid (PABA, Sigma-Aldrich), through soaked filters on top of the 2 ml tubes and with soaked filter pads inside cages. Red blood cells (RBCs) were washed with Roswell Park Memorial Institute (RPMI) medium and stored in RPMI at 50% haematocrit at 4° C. until use. To measure the effect of HMBPP on mosquito fitness, RBCs stored in RPMI were centrifuged at 2500×g for 5 min followed by replacement of the medium with AB serum for a final haematocrit of 40%. HMBPP (stock concentration at 4 mM in Nanopure water, stored at −80° C.) was diluted to 10 µM in 1 ml RBC suspension, and the corresponding volume of Nanopure water was added to the control RBCs. All experiments were, unless otherwise stated, conducted on 5-7 days post-emergence female mosquitoes maintained in separated cages (approximately 210 individuals per cohort) and fed RBCs either with or without HMBPP for 30 min. All experiments were performed in triplicates.

$Plasmodium\ falciparum$ Culture and Strain:

A strain of the human malaria parasite $P.\ falciparum$, denoted NF54 (T. Ponnudurai, et al., Trop Geogr Med, 33, 50-54 (1981); kindly donated by Klays Berzins, Stockholm University), known to produce gametocytes infectious to mosquitoes (D. Walliker, paper presented at the Symposia on Molecular and Cellular Biology New Series 42, UCLA (1987)), was used for all experimental infections. Parasites were cultured in vitro according to standard protocols (W. Trager and J. B. Jensen, Science, 193, 673-675 (1976)) at 5% haematocrit in complete RPMI-1640 medium with 10% human serum under a gas environment of 1% $O_2$, 3% $CO_2$ and 96% $N_2$ (Labline, Goteborg, Sweden). The culture medium was replaced daily and parasitaemia assessed using Giemsa staining every two days (ibid.). When the parasitaemia reached ~6% (approximately 2 days after initiating the culture), cultures were diluted with a freshly made 5% haematocrit mixture of RBCs/complete medium. Asexual, synchronised trophozoites were fed to mosquitoes at 5% parasitaemia.

Mosquito Infectious Feed:

$Plasmodium\ falciparum$ gametocyte cultures (NF54 strain) were set up at 0.5-0.7% parasitaemia, 6% haematocrit in complete RPMI medium, according to standard procedures (R. Carter, et al. Methods Mol Biol, 21, 67-88 (1993)). For each infectious feeding, a mixture of gametocytes from 14- and 17-day gametocyte cultures were used (ibid.). On the day of experimental infection, uninfected RBCs were supplemented with $P.\ falciparum$ gametocytes to a final gametocytaemia of approximately 3%, which is known to generate good infection prevalence (>50% in $A.\ gambiae$ s.s. mosquitoes; ibid.). To measure the effect of HMBPP on parasite infectiousness, two groups of approximately 210 mosquitoes were fed on mature gametocyte-infected red blood cells (giRBCs) with or without HMBPP using a membrane feeder, as previously described (ibid.). Gametocyte density was kept equal in control and treatments. To give the final gametocytaemia of 3% in each tubes, on the day of feed, the final mature gametocytaemia was calculated in cultures and then the volume of gametocyte inoculum was estimated per 1 ml of blood. The gametocyte inoculum was prepared using an equal volume (~400 µl) of the gametocyte mixture was added to 1 ml of each of the blood treatments (with/without HMBPP). Adding a fixed volume of well-mixed gametocyte culture to a fixed volume of each blood treatment, it was ensured that parasite density (no. gametocytes per ml) was constant in both groups.

Dual Choice:

Initial experiments were performed using a Y-tube olfactometer (length of the central cylinder and two arms: 25/15/15 cm respectively, inner diameter: 5 cm; see FIG. 1a). For each experiment, 180 female mosquitoes were individually placed in a release chamber and flown one by one. Females flew towards the upwind end (airflow 3 L min$^{-1}$) and entered one of two trapping chambers through which odour released from nearby membrane feeders passed (5 cm distance to each trapping chamber). Three experiments were conducted. In the first experiment, the membrane feeders were loaded with RBCs with or without HMBPP, while in the second they were loaded with serum with or without HMBPP. The third experiment was performed with a 5% glucose with 0.05% PABA solution with or without HMBPP. To control for possible spatial effects, the location of treatment at each olfactometer arm was switched every 30 minutes (~15 mosquitoes flied one by one in each 30 minutes). Each replacement (feeder rotation with fresh RBCs) was counted as an experimental replicate (experimental block). Mosquitoes reaching any of the trapping chambers were considered to have made a choice. Each experiment was repeated six times with in total 180 mosquitoes per treatment.

Feeding Proportion Experiments:

Fifty mosquitoes were isolated in three separate cages (8 cm internal diameter×10 cm in height) covered with netting, and fed on 1 ml of control RBCs, hRBCs or giRBCs, respectively. Each group was allowed to feed on its own separated membrane feeder for 90 s, the average time for *Anopheles* mosquito engorgement (D. D. Chadee and J. C. Beier, Ann Trop Med Parasitol, 89, 531-540 (1995)). For each group, the number of fully fed mosquitoes compared to unfed controls was immediately recorded. In another set of feeding experiments, serum or a 0.9% physiological saline solution (NaCl, pH 7.4), either with or without 10 µM HMBPP, were offered to mosquitoes during a 5 min feeding window, and the number of fed mosquitoes recorded every minute for each cage separately. In the saline experiment, an additional treatment of 10 µM IPP in NaCl was included.

Fosmidomycin Assay:

The fosmidomycin assay was carried out as previously described (12). 48 hours (h) after the initiation of antibiotic treatment (FR-900098, the N-acetyl analogue to fosmidomycin), asexual parasite cultures were rescued by supplementation with 200 µM IPP for 48 h of continued passaging. Media from the rescued culture were collected and offered to mosquitoes, in comparison with media from control parasites (without antibiotic treatment). Fifty mosquitoes, isolated in two separate cages, were offered different treatments. Each group was allowed to feed on its own membrane feeder for 90 s.

Volatile Collection and GC-MS Analysis:

RBCs (1 ml) were transferred to 4 ml glass vials closed with auto-sampler screw caps, and equilibrated in a thermostat at 38° C. for 15 min. Then, 2.5 µl of HMBPP or Nanopure water were added to the RBCs samples (final concentration: 10 µM HMBPP per sample). Volatiles were collected from the headspace using solid phase microextraction (SPME; Supelco, Bellmonte, Pa., USA) (M. J. Yang, el al., J. Chem. Educ., 74, 1130-1132 (1997) and A. K. Borg-Karlson and R. Mozuraitis, Naturforsch., C. 51, 599-602 (1996)). Prior to headspace exposure, the polydimethylsiloxane/divinylbenzene/carboxene-coated SPME fiber (grey) was conditioned for 5 min at 250° C. in a gas chromatograph (GC) injector (6890, Agilent Technologies, Santa Clara, Calif., USA). Volatiles were collected for 30 min (n=5). The volatiles on SPME fiber were then desorbed in the injector (splitless mode, 0.5 min, 225° C.) of a combined Agilent 7890 GC and 5977 mass spectrometer (MS). Helium was used as the carrier gas with a constant flow of 35 cm min$^{-1}$. The GC was equipped with a DB-wax coated fused silica capillary column (J&W Scientific, Folsom, Calif., USA; 60 m×0.25 mm i.d., d.f.=0.25 µm). The GC oven temperature was programmed from 30° C. (3 min hold) to 225° C., increasing at 8° C. min$^{-1}$, then isothermal for 10 min. Electron ionisation mass spectra were determined at 70 eV with the ion source kept at 230° C. and mass spectra were obtained at mass to charge ratio (m/z) 29-400. Chromatographic profiles of volatiles, which were sampled from RBCs and hRBCs, were compared. The compounds that were more abundant in the hRBC samples were identified according to their retention indices (Retention Index) and mass spectra in comparison with the NIST library (Agilent Technologies) and authentic standards. A similar protocol was used for the quantification of $CO_2$, with the mass spectral data and GC retention times being compared with emission from frozen $CO_2$. The relative amounts of $CO_2$ in arbitrary units were determined from the areas of the respective chromatogram peaks using single ion display mode at m/z 44±0.5 Da. The amounts of identified compounds were quantified by the use of extracted ion chromatograms, since they are very minute. The compounds identified were the only volatiles identified in the SPME samples. The estimations were based on the very same quantifications given in 'arbitrary area units'. The SPME volatile collections were made under very controlled conditions: the same volume of 'RBCs' and the very same temperature, which gives the same % RH in the vials, and under these very same conditions the affinities of the volatiles to the SPME fiber coating are the same.

Infrared-Gas Analysis (IRGA) of RBC $CO_2$ Production:

RBCs from a single donor (500 µl) were pipetted into pre-weighed aluminium cups, and then distilled water (control) or 10 µM HMBPP was added after 30 s, after which measurement began. Total sample preparation time was 90 seconds (s). The analysis of RBCs and hRBCs was performed, in parallel and in triplicate, on two consecutive days. Total $CO_2$ production was measured with a Li-7000 $CO_2$ analyser (LiCor, Lincoln, Nebr., USA) connected to a flow-through differential mode respirometry system (Sable Systems, Las Vegas, Nev., USA). Two separate lines of air were scrubbed of $H_2O$ and $CO_2$ using drierite and ascarite, respectively, at 60 ml min-1 using SS4 sub-samplers (Sable Systems). Two cylindrical glass respirometry chambers (volume 10 ml; of which an empty chamber served as the baseline) were connected to a MUX multiplexer (Sable Systems) at 37° C. Preliminary tests were performed to ensure that the incurrent air temperature flowing through the respirometry chamber was stabilised with the surrounding ambient temperature (37° C.). The multiplexer was programmed to measure the empty chamber baseline for 10 s, the chamber containing the RBC sample for 5 minutes (min) and then the empty chamber for 1 min. The sampling interval was 1 Hz. The RBC and hRBC samples were weighed (±0.1 mg, AM100; Mettler TOLEDO, Columbia, Ohio, USA) post-assay. Respirometry data were baseline corrected and converted to ml $CO_2$ h$^{-1}$ by the acquisition and analysis software Expedata version 1.7.30 (Sable Systems, Las Vegas, Nev., USA). Prior to measurements, the $CO_2$ analyser was calibrated with 1000 ppm $CO_2$ in nitrogen.

Olfactometer Bioassay:

Behavioural experiments were performed using different odour sources with and without pulsed $CO_2$ stimuli in a Plexiglas Y shaped olfactometer (9.5 cm i.d.×length of the central cylinder and two arms: 120/120/120 cm respectively), illuminated from above at 280 lx. A charcoal-filtered and humidified air stream (25±2° C., RH 65±2%) passed through stainless steel mesh screens at 30 cm $s^{-1}$ to generate a laminar flow in the olfactometer. Odors were introduced into the air stream of each arm at the downwind end. Synthetic air (79.1% $N_2$, 20.9% $O_2$; Strandmöllen, Ljungby, Sweden) was pumped through an activated charcoal filter, humidified and then split between the two treatments. Odor sources consisted of either RBC-based treatments or headspace extracts. RBC-based treatments included RBCs alone, hRBCs, giRBCs or ippRBCs (RBCs supplemented with HMBPP, gametocytes or IPP), as well as RBCs with supernatants from gametocyte-infected RBCs, or RBCs supplemented with the synthetic odour blend. Headspace extracts collected from hRBCs and giRBCs were used. Treatments including RBCs were heated to 37° C. prior to being pumped (150 ml $min^{-1}$) into the airstream of each arm separately. The blend and headspace extracts were delivered to each arm via a wick dispenser. Carbon dioxide (Strandmöllen) was introduced into a plume generator that was placed behind the metal screens to create a homogenous-pulsed flow, which was regulated by a stimulus controller (SEC-2/b, Syntech, Löptin Germany). In treatments including 5 ppm $CO_2$, pure $CO_2$ was mixed with synthetic air at 1.5 l $min^{-1}$ to generate the homogenised pulses in the selected arm. A $CO_2$ analyser (LI-COR Biosciences, Nebraska, USA) was used to measure the concentration of $CO_2$ and track the pulsed stimuli at the downwind end of the olfactometer. Female mosquitoes were stored individually in 7×9 cm internal diameter release cages in the bioassay chamber for 1 h before experiments. A release cage was placed at the downwind end of the wind tunnel. After 1 min acclimatisation, the cage door was opened and the female mosquito was allowed 90 s to fly toward either of the provided odour sources. Only females that reached the upwind capture cages were considered to have made a choice. Each experiment was repeated using 90 flown individual mosquitoes per condition (~15 mosquitoes flown one by one in each 30 minutes).

Statistical Analysis:

GLMM statistical modelling was used to corroborate the validity of results based on the whole data set by including the effect of replications (experimental blocks), including weighting for multiple replications. In all analyses, the effect of the main experimental effects (e.g. treatment) was investigated while controlling for variation in experimental replication (random variable). For all results, the significance of all explanatory effects were evaluated by using likelihood ratio test (LRT). Analyses were performed using R statistical software. In all analyses, HMBPP supplementation of RBCs was investigated as the primary effect of interest. Generalised Linear Mixed Models (GLMM, R statistical software v. 3.1.1) assuming a binomial distribution were used to test the effect of HMBPP on the binary response variable of dual choice in the attraction, feeding rate, oviposition, and oocyst and sporozoite infection prevalence assays (Logistic regression models, absent or present; lme4 package, glmer, R, v. 3.1.1). Logistic regression is a powerful statistical method for binomial outcome (take the value 0 or 1) with one or more explanatory variables. In this study, we included at least two variables: 1-Treatment (main effect) and 2-Experimental blocks (random effect). In all analyses, Treatment (e.g. blood with/without HMBPP) was investigated as the main effect of interest (M. Crawley, *The R book*, John Wiley & Sons Ltd., (2007)). A similar approach was used to test for variation in oocyst intensity between different experimental treatments. Given the highly over-dispersed nature of parasite abundance data, negative binomial distribution was assumed in these GLMMs (glmmADMB, nlme package, R, v. 3.1.1). For blood meal size, oviposition rate, fecundity and survival, a backwards elimination approach was used to test for the significance of all fixed effects (HMBPP treatment, body size) and their interactions, while controlling for random variation within each replicate. Mosquito body size was fitted as an additional fixed explanatory variable in all cases due to considerable influence in variation of mosquito feeding and fitness parameters (E. O. Lyimo and W. Takken, Med Vet Entomol, 7, 328-332 (1993)). Survival analysis was conducted using the Cox proportional hazards model in the R statistical software (v.3.1.1) to assess whether mosquito longevity (days until death) varied between experimental treatments. In this analysis, a frailty function was used to integrate the random effect of replicates into the Cox model with HMBPP treatment and mosquito wing length fitted as fixed effects. From this maximal model, non-significant terms were sequentially removed through backward elimination to reach the minimal statistically significant model (B. M. Bolker, Ecological models and data in R, Princeton University Press (2008)). Analysis was restricted to estimating variation in mosquito survival up to 14 dpi and death, sequentially. The difference between means of $CO_2$ emission from treated versus control samples was analysed with a paired Student t-test using the IBM SPSS statistics 20.0 (IBM SPSS Inc., Chicago, Ill., USA) statistical software package. Experiment replication was treated as a random variable in all statistical mixed models. All data conformed to the assumptions of the test (normality and error homogeneity). In all mixed models, a maximal model was built that included fixed effects plus the random effects of the experimental replicates.

Following the above-mentioned general experimental methods, the following example experiments were conducted.

Example 1—Direct and Indirect Effects of HMBPP on Mosquito Attraction and Feeding In a dual choice attraction bioassay, 95% of the host-seeking mosquitoes chose HMBPP-supplemented (hRBCs) over RBCs, suggesting the involvement of airborne factors derived from hRBCs. HMBPP-supplemented serum or glucose solution (5%) containing para-aminobenzoic acid (PABA 0.05%) did not, however, increase attraction, which indicates that the attraction is an RBC dependent and indirect effect (see FIG. 1A). The diol, (2E)-2-methylbut-2-ene-1,4-diol, a putative volatile form of HMBPP, had no effect on the attraction of mosquitoes to RBCs, indicating that the phosphate groups are required for the activity of HMBPP.

RBC feeding rates were compared with hRBCs, *P. falciparum* asexual trophozoite- and gametocyte-infected RBCs (tiRBCs and giRBCs, respectively). The proportion of females fed more than doubled when hRBCs, tiRBCs or giRBCs were provided, respectively (see FIG. 1B). The amount of HMBPP released in the medium of giRBCs was investigated and found to be sufficient to stimulate mosquito blood feeding. The proportion of mosquitoes feeding on RBCs supplemented with HMBPP (hRBCs) or supernatants from giRBCs, respectively, were compared over a wide range of concentrations (see FIGS. 10 and D). This confirmed that 10 μM HMBPP, used in the experiments the results of which are shown in FIGS. 1A and B, corresponds to the concentration present in the undiluted supernatant from giRBCs, and also that substantially lower doses are sufficient to trigger enhanced mosquito feeding (see FIG. 10). Moreover, treatment of tiRBCs with a fosmidomycin derivative to block HMBPP synthesis (E. Yeh and J. L. DeRisi, PLoS Biol 9, e1001138 (2011)) resulted in a reduction of feeding to control levels, despite supplementation with the universal isoprenoid and downstream metabolite IPP (see FIG. 1D, triangle). Thus, it can be sene that HMBPP released from parasite-infected RBCs is a key metabolite for triggering mosquito feeding stimulation.

To further decipher the phagostimulatory action of HMBPP, cell-free meals were provided to mosquitoes and the percentage of females that landed and initiated probing and feeding (referred to as percent persistency within 5 min) was examined (see FIGS. 1E and F). Approximately 80% of the mosquitoes displayed behavioral persistence when provided HMBPP-supplemented serum compared to 20% of those provided with serum alone (see FIG. 1E). Supplementation of a physiological salt solution with HMBPP generated a similar effect (see FIG. 1F). Hence, it can be seen that HMBPP acts as a phagostimulant that is neither dependent on factors from RBCs, nor from the serum. IPP displayed no phagostimulatory effect, suggesting a direct activity of HMBPP (see FIG. 1F).

Example 2—Attraction of Mosquitoes to Red Blood Cells (RBCs), RBCs Plus Media (M) or HMBPP-Supplemented RBCs (hRBCs)

Using a larger Y-tube olfactometer, it was confirmed that hRBCs could mimic the attraction of mosquitoes to giRBCs, while IPP supplemented RBCs (ippRBCs) did not (see FIG. 2A). It was therefore shown that HMBPP indirectly stimulates attraction via the release of volatiles from RBCs, and acts directly as a feeding stimulant, whereas the structurally similar downstream IPP confers neither of these effects (M. E. Smalley, et al., Trans R Soc Trop Med Hyg, 75, 318-319 (1981) and A. L. Ouedraogo, et al., Acta Trop, 105, 28-34 (2008)). These findings all point to parasite-derived HMBPP modulatory effects within the malaria-infected human host affecting the blood seeking and feeding behaviors of its vector, the Anopheline mosquito.

The volatiles released from hRBC, giRBC and RBCs were investigated. Since carbon dioxide ($CO_2$), emitted from vertebrates through skin and breath, is a key activator and attractant for host-seeking anopheline mosquitoes (G. W. Frame, et al., J Invest Dermatol, 59, 155-159 (1972) and B. A. Omondi, et al., J Exp Biol., 218, 2482-2488 (2015)), $CO_2$ emission was quantified. Through combined gas chromatography-mass spectrometry (GC-MS) (G. W. Frame, et al., J Invest Dermatol, 59, 155-159 (1972)) and quantitative respirometry $CO_2$ release was estimated. The amount of $CO_2$ released into the gas headspace above hRBC suspensions increased by 16% compared to RBCs alone (see FIG. 2B), an increase that is thought to be sufficient to promote mosquito attraction (B. A. Omondi, et al., J Exp Biol., 218, 2482-2488 (2015) and T. Dekker, et al., J Exp Biol, 208, 2963-2972 (2005)). However, carbon dioxide supplementation of RBCs not sufficient to reproduce the full mosquito attraction to hRBCs (see FIG. 2A), indicating the involvement of additional volatiles.

The headspace above hRBC and giRBC suspensions was collected and the behavioral response of mosquitoes in the presence or absence of $CO_2$ was assayed. The response to headspace extracts of hRBCs and giRBCs, in the presence but not in the absence of $CO_2$, fully reproduced that of hRBCs (see FIG. 2A).

Solid-phase microextraction (SPME) and GC-MS analyses of the headspace from hRBCs identified an increase in aldehydes (C8-C10:al; 1.7-to-5.2 fold) and monoterpenes (α- and ß-pinene, limonene; 1.2-to-1.6 fold) compared to that of the headspace of RBCs (see FIGS. 2C and D).

The proportions of compounds identified in the headspace for hRBCs are as follows.

| Compound | % by weight (of the combined compounds) |
| --- | --- |
| α-pinene | 7 |
| ß-pinene | 5 |
| limonene | 18 |
| octanal | 23 |
| nonanal | 35 |
| decanal | 12 |

A synthetic blend of these volatiles with $CO_2$, at their enhanced natural emission rates and ratios, was able to reproduce the behavioral attraction of *A. gambiae* s.l. to hRBCs in a dose dependent manner (see FIG. 2E). The synthetic blend also attracted females more strongly than that of RBCs alone, both with and without $CO_2$ (see FIG. 2E).

Example 3—Effects of HMBPP on Mosquito Fitness and Parasite Transmission Success and Schematic Model Females were fed on red blood cells (RBCs) or HMBPP-supplemented RBCs (hRBCs). The presence of HMBPP significantly increased the size of mosquito blood meals (see FIG. 3C), which was also shown to be independent of mosquito body size. Previous studies have indicated that the parasite can cause an increase in the amount of blood imbibed by the mosquito, which could potentially increase nutrient gain and enhance reproductive capacity of the vector (H. Hurd, Annu Rev Entomol, 48, 141-161 (2003)). Neither mosquito fecundity, nor survival was affected by HMBPP, despite the prompted larger blood meals (see FIGS. 3B and 3A).

Inhibition of the *Plasmodium* MEP pathway is lethal without continuous IPP addition (E. Yeh and J. L. DeRisi, PLoS Biol 9, e1001138 (2011)). This was tested by feeding mosquitoes with giRBCs with or without additional HMBPP and subsequently monitoring the burden of infection in the mosquito during the parasite sporogonic period. Equal gametocyte density was used in both treatments (3%). Oocyst prevalence (proportion of oocyst-carrying mosquitoes) among groups of females was not significantly different between treatments (close to 100% in both groups), whereas oocyst intensity (number of oocyst per midgut) was higher in mosquitoes fed on HMBPP-supplemented giRBCs (see FIG. 3D). The addition of HMBPP to blood meals also resulted in significantly higher sporozoite prevalence (proportion of sporozoite-carrying mosquitoes) and intensity (number of sporozoites per salivary gland; (see FIG. 3E). Taken together, these findings suggest that HMBPP per se has no obvious deleterious effects on vector fitness, but increases the mosquito susceptibility to *Plasmodium* infection: parasite prevalence (proportion of parasite-transmissible mosquitoes) and intensity (parasite loads).

The invention claimed is:

1. A combination product or kit-of parts comprising:
   (a) (E)-4-hydroxy-3-methyl-but-2-enyl pyrophosphate (HMBPP);
   (b) an effective amount of a mosquito and/or parasite control agent; and optionally
   (c) a food source.

2. The combination product or kit-of parts of claim 1, wherein the product or kit-of-parts comprises an effective amount of the mosquito control agent, wherein the mosquito control agent is capable of affecting a mosquito population or the ability of a mosquito to act as a vector for a parasite.

3. The combination product or kit-of parts of claim 2, wherein the mosquito control agent is a mosquito killing agent.

4. The combination product or kit-of parts of claim 2, wherein the mosquito control agent is a chemical compound which is capable of inducing death in mosquitoes upon consumption of an effective amount thereof.

5. The combination product or kit-of parts of claim 2, wherein the mosquito control agent is a mosquito pathogen which is capable of affecting mosquito populations.

6. The combination product or kit-of parts of claim 2, wherein the mosquito control agent is a mosquito pathogen and the mosquito pathogen is a bacterial agent.

7. The combination product or kit-of parts of claim 6, wherein the bacterial agent is *Bacillus thurgiensis*.

8. The combination product or kit-of parts of claim 2, wherein the mosquito control agent is mosquito pathogens which are capable of affecting the ability of a mosquito to take on, carry and/or transmit a parasite.

9. The combination product or kit-of parts of claim 2, wherein the product or kit-of-parts comprises an effective amount of a parasite control agent, wherein the parasite control agent is capable of killing a parasite within a mosquito.

10. The combination product or kit-of parts of claim 9, wherein the parasite control agent is commensal bacteria that have been genetically modified.

11. The combination product or kit-of parts of claim 1, wherein the product or kit-of-parts further comprises a mosquito attractant.

12. The combination product or kit-of parts of claim 1, wherein the product or kit-of-parts comprises at least 1% of HMBPP by weight of the product or kit-of-parts.

13. The combination product of kit-of-parts of claim 1, wherein the food source comprises carbohydrates, lipids, proteins, vitamins, minerals, electrolytes and/or hydration.

14. The combination product or kit-of-parts of claim 13, wherein the food source comprises proteins and/or lipids.

15. The combination product or kit of parts of claim 13, wherein the food source is an aqueous sugar solution.

16. A mosquito control product comprising:
    (a) a mosquito trapping and/or killing device;
    (b) (E)-4-hydroxy-3-methyl-but-2-enyl pyrophosphate (HMBPP); and
    (c) a food source, and/or an effective amount of a mosquito and/or a parasite control agent.

17. The mosquito trapping and/or killing device of claim 16, wherein the combination product comprises an effective amount of a mosquito control agent, wherein the mosquito control agent is capable of affecting a mosquito population or the ability of a mosquito to act as a vector for a parasite.

18. The mosquito trapping and/or killing device of claim 17, wherein the mosquito control agent is a mosquito killing agent.

19. The mosquito trapping and/or killing device of claim 17, wherein the mosquito control agent is a chemical compound which is capable of inducing death in mosquitoes upon consumption of an effective amount thereof.

20. The mosquito trapping and/or killing device of claim 17, wherein the mosquito control agent is a mosquito pathogen which is capable of affecting mosquito populations.

21. The mosquito trapping and/or killing device of claim 17, wherein the mosquito control agent is a mosquito pathogen and the mosquito pathogen is a bacterial agent.

22. The mosquito trapping and/or killing device of claim 21, wherein the bacterial agent is *Bacillus thurgiensis*.

23. The mosquito trapping and/or killing device of claim 17, wherein the mosquito control agent is mosquito pathogens which are capable of affecting the ability of a mosquito to take on, carry and/or transmit a parasite.

24. The mosquito trapping and/or killing device of claim 17, wherein the combination product comprises an effective amount of a parasite control agent, wherein the parasite control agent is capable of killing a parasite within a mosquito.

25. The mosquito trapping and/or killing device of claim 24, wherein the parasite control agent is commensal bacteria that have been genetically modified.

26. The mosquito trapping and/or killing device of claim 16, wherein the product further comprises a mosquito attractant.

27. The mosquito trapping and/or killing device of claim 16, wherein the product comprises at least 1% of HMBPP by weight of the product.

28. The mosquito trapping and/or killing device of claim 16, wherein the food source comprises carbohydrates, lipids, proteins, vitamins, minerals, electrolytes and/or hydration.

29. The mosquito trapping and/or killing device of claim 28, wherein the food source comprises proteins and/or lipids.

30. The mosquito trapping and/or killing device of claim 28 wherein the food source is an aqueous sugar solution.

* * * * *